United States Patent
Wang et al.

(10) Patent No.: US 9,857,514 B2
(45) Date of Patent: Jan. 2, 2018

(54) ELECTRONIC DEVICE BEZEL

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Liang-Chin Wang, New Taipei (TW); Nian-Yuan Yang, Wuhan (CN); Shuai-Guo Wang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 277 days.

(21) Appl. No.: 14/683,855

(22) Filed: Apr. 10, 2015

(65) Prior Publication Data
US 2016/0216437 A1 Jul. 28, 2016

(30) Foreign Application Priority Data
Jan. 24, 2015 (CN) .......................... 2015 1 0034825

(51) Int. Cl.
*G02B 6/00* (2006.01)
*F21V 8/00* (2006.01)

(52) U.S. Cl.
CPC .................................. *G02B 6/001* (2013.01)

(58) Field of Classification Search
CPC .... F21K 9/61; G02B 6/001; B60Q 3/10–3/14; F21V 33/0052; F21V 33/0056

USPC .......................................................... 362/511
See application file for complete search history.

(56) References Cited

U.S. PATENT DOCUMENTS

| | | | | |
|---|---|---|---|---|
| 6,123,442 A | * | 9/2000 | Freier | G02B 6/001 362/559 |
| 8,095,180 B2 | * | 1/2012 | Lee | H04M 1/0237 455/556.1 |
| 2004/0066659 A1 | * | 4/2004 | Mezei | G02B 6/001 362/555 |
| 2004/0076020 A1 | * | 4/2004 | Hsieh | G02B 6/0001 362/581 |
| 2004/0107616 A1 | * | 6/2004 | Ko | G09F 13/28 40/550 |
| 2008/0225552 A1 | * | 9/2008 | Capriola | G02B 6/001 362/559 |
| 2009/0003014 A1 | * | 1/2009 | Jablonski | A43B 1/0036 362/602 |
| 2010/0064866 A1 | * | 3/2010 | Freeman | A01D 34/416 83/13 |
| 2011/0073449 A1 | * | 3/2011 | Yen | F21V 33/0052 200/314 |
| 2012/0170304 A1 | * | 7/2012 | Purfuerst | G02B 6/001 362/555 |

(Continued)

*Primary Examiner* — Julie Bannan
(74) *Attorney, Agent, or Firm* — ScienBiziP, P.C.

(57) ABSTRACT

An electronic device bezel includes a front panel, a light source, a light transmitting member, and a light guiding member mounted in the light transmitting member. The light source is mounted on an inner side of the front panel. The light transmitting member mounted on an outer side of the front panel. An end of the light guiding member extends through the front panel and is aligned with the light source to guide a plurality of light beams emitted from the light source to the light transmitting member.

16 Claims, 4 Drawing Sheets

(56) References Cited

U.S. PATENT DOCUMENTS

2015/0291092 A1* 10/2015 Nirei .................. G01D 11/28
362/511
2016/0195661 A1* 7/2016 Koyama ............... G02B 6/001
362/606

* cited by examiner

ELECTRONIC DEVICE BEZEL

CROSS-REFERENCE TO RELATED APPLICATIONS

This application claims priority to Chinese Patent Application No. 201510034825.X filed on Jan. 24, 2015, the contents of which are hereby incorporated by reference.

FIELD

The subject matter herein generally relates to electronic devices, and more particularly to an electronic device bezel with a light-guide structure.

BACKGROUND

Light sources are usually mounted to a front panel of an electronic device. A plurality of light beams emitted from the light sources will shine on the front panel to obtain a better visual effect, thereby attracting attention of customers.

BRIEF DESCRIPTION OF THE DRAWINGS

Implementations of the present technology will now be described, by way of example only, with reference to the attached figures.

DETAILED DESCRIPTION

Figure 1:
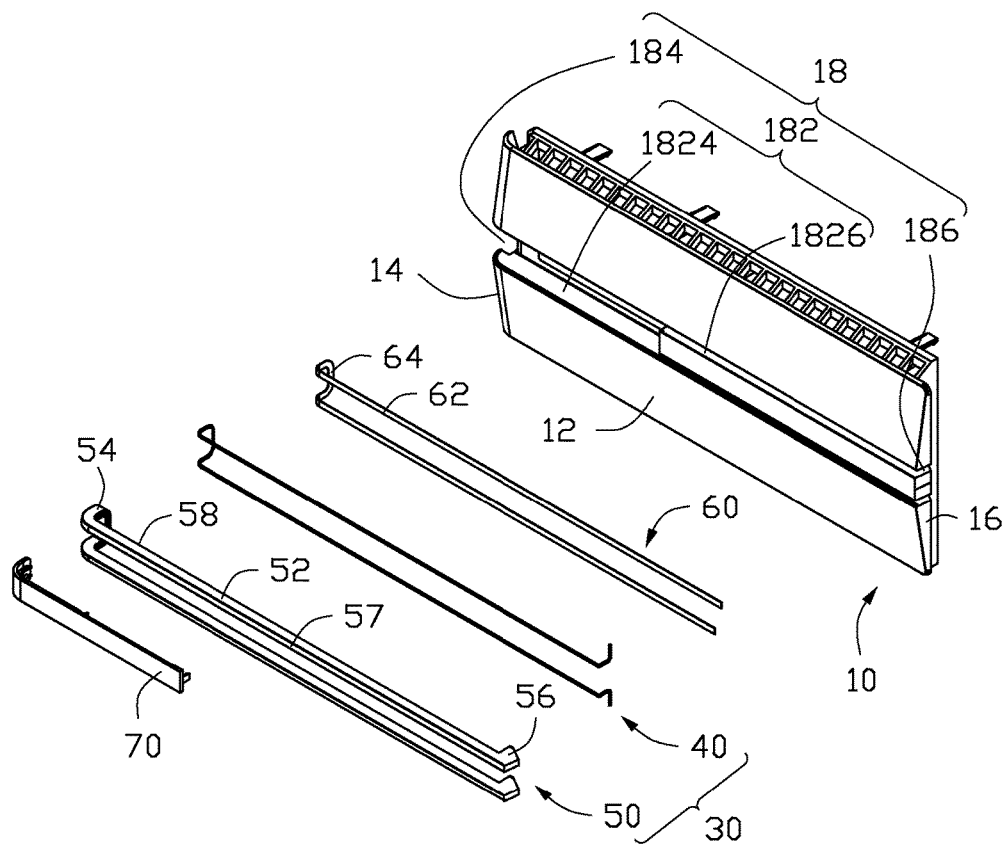
FIG. 1 is an exploded, isometric view of an electronic device bezel in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
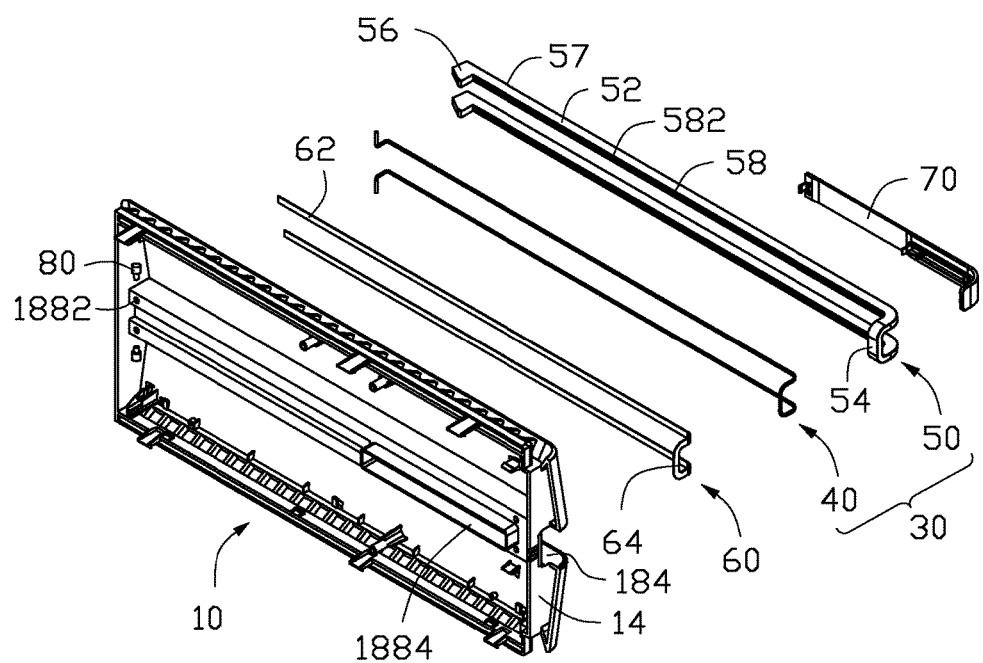
FIG. 2 is similar to FIG. 1, but viewed from a different angle.

FIG. 1 and FIG. 2 illustrate an embodiment of an electronic device bezel can include a front panel 10, a light-guide structure 30, a light shading member 60, a cover plate 70, and two light sources 80 mounted on an inner side of the front panel 10.

The front panel 10 can include a front wall 12, a first sidewall 14, and a second sidewall 16. The first sidewall 14 and the second sidewall 16 are connected to the front wall 12 and located at two opposite sides of the front wall 12. A receiving space 18 is defined in an outer side of the front panel 10 and can include a receiving groove 182 defined in the front wall 12, a first mounting groove 184 defined in the first sidewall 14, and two second mounting grooves 186 defined in the second sidewall 14. Two ends of the receiving groove 182 are separately connected to the first mounting groove 184 and the two second mounting grooves 186.

The receiving groove 182 can include a first receiving groove 1824 and two second receiving grooves 1826 extending from a side of the first receiving groove 1824. The two second receiving grooves 1826 are parallel to each other. The first receiving groove 1824 communicates with the first mounting groove 184, and each second receiving groove 1826 communicates with each second mounting groove 186. In at least one embodiment, the receiving space 18 can be an arbitrary shape according to requirements, such as a rectangular shape, a circular shape, or an arc shape, and so on.

The receiving space 18 further includes a bottom plate 188 parallel with the inner side of the front panel 10. Two through holes 1882 are symmetrically defined in the bottom plate 188 of the two second receiving grooves 1826. An opening 1884 is defined in the bottom 188 of the first receiving groove 1824 and configured for inserting a disk drive.

The light-guide structure 30 can include a light guiding member 40 and a light transmitting member 50. In at least one embodiment, the light guiding member 40 is an optical fiber. The light transmitting member 50 can include two main light portions 52, an auxiliary light portion 54, and two engaging portions 56. The auxiliary light portion 54 is connected to the two main light portions 52. Each engaging portion 56 is located at a free end of each main light portion 52. In at least one embodiment, the two main light portions 52 are elongated and parallel with each other, the auxiliary light portion 54 is a "U" shape, and each engaging portion 56 is a hook.

The light transmitting member 50 further includes an outer surface 57 and an inner surface 58. A mounting slot 582 is defined in an inner surface of the two main light portions 52 and the auxiliary light portion 54.

The light shading member 60 can include two main light shading portions 62 and an auxiliary light shading portion 64 connected to the two main light shading portions 62. In at least one embodiment, the two main light shading portions 62 are parallel to each other, the auxiliary light shading portion 64 is "U" shape, and the light shading member 60 is made of rubber.

Figure 3:
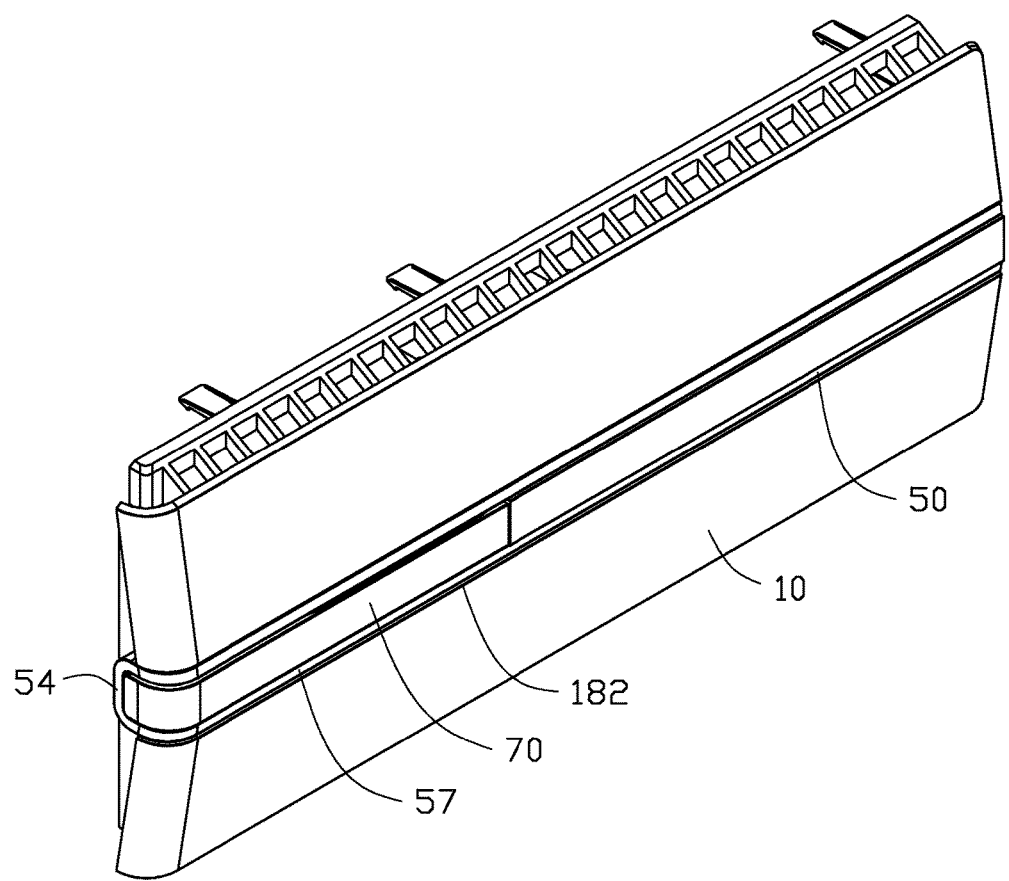
FIG. 3 is an assembled, isometric view of the electronic device bezel of FIG. 2.
Figure 4:
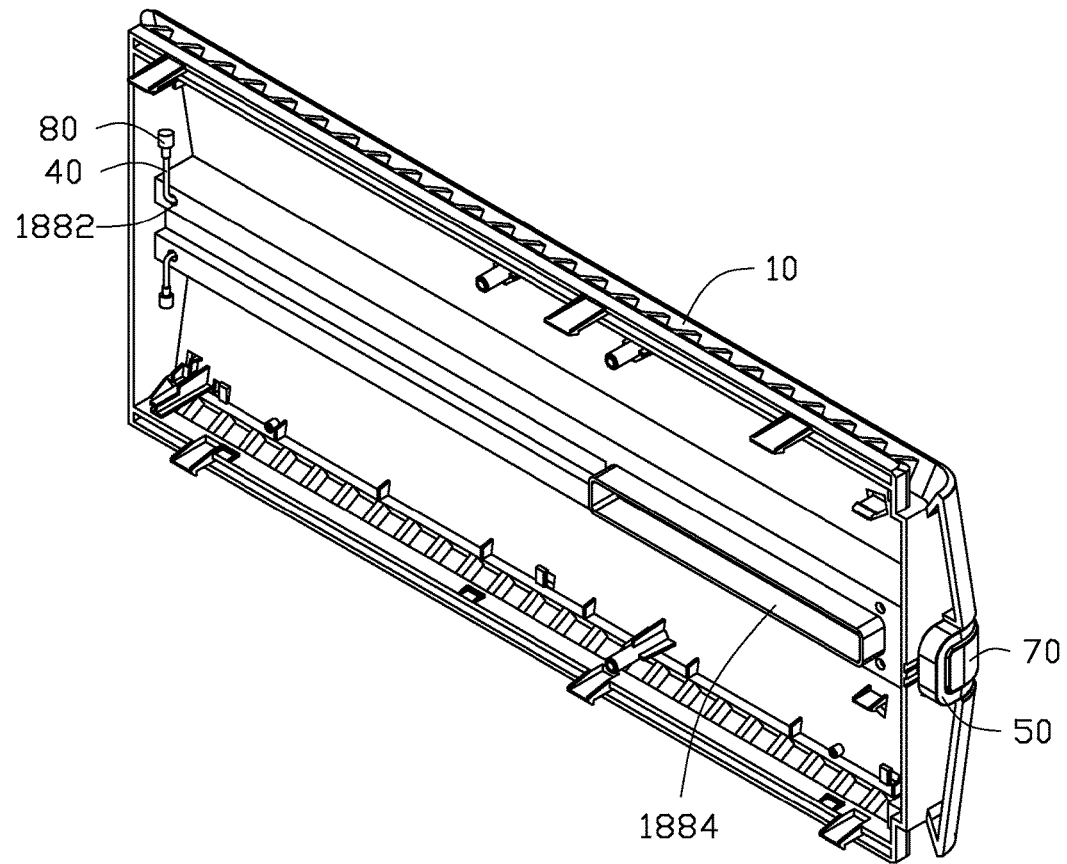
FIG. 4 is similar to FIG. 3, but viewed from a different angle.

FIG. 3 and FIG. 4 illustrate when in assembly of the electronic device bezel. The light shading member 60 is mounted in the receiving space 18. The two main light shading portions 62 are received in the receiving groove 182, and the auxiliary light shading portion 64 is received in the first mounting groove 184. In at least one embodiment, the light shading member 60 can be pasted on the bottom plate 188 of the receiving space 18. The light guiding member 40 is mounted in the mounting slot 582. In at least one embodiment, the light guiding member 40 is exposed from the inner surface 58 of the light transmitting member 50.

The light transmitting member 50 is received in the receiving space 18 of the front panel 10, two ends of the light guiding member 40 are separately inserted through the two through holes 1882, and each end of the light guiding members 40 is aligned with one of the two light sources 80. The two main light portions 52 are received in the receiving groove 182, the auxiliary light portion 54 is received in the first mounting groove 184, and the engaging portion 56 is engaged in the second mounting groove 186. The outer surface 57 of the light transmitting member 50 is exposed from the front panel 10, the light shading member 60 is attached to the inner surface 58 of the light transmitting member 50 and the bottom plate 188, and the light transmitting member 50 and the two light sources 60 are located at two sides of the front panel 10. In at least one embodiment, the outer surface 57 is flush with the front panel 10. The cover plate 70 is mounted to the front panel 10 to cover the opening 1884, and located between the two main light portions 52 and the auxiliary light portion 54. In at least one embodiment, the light guiding member 40 is not mounted in the light transmitting member 50 but clamped by the light transmitting member 50 and the light shading member 60.

The light guiding member 40 can receive a plurality of light beams emitted from the two light sources 80 via the two ends of the light guiding member 40 and guide the plurality of light beams to the light transmitting member 50, and the light transmitting member 50 can shine out the plurality of light beams. The light shading member 60 can keep the plurality of light beams out of the inner side of the front panel 10.

The embodiments shown and described above are only examples. Many details are often found in the art such as the other features of an electronic device bezel. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An electronic device bezel comprising:
a front panel;
a light source mounted on an inner side of the front panel;
a light transmitting member mounted on an outer side of the front panel;
a light guiding member mounted in the light transmitting member;
a light shading member; and
a receiving space defined in the outer side of the front panel, wherein the receiving space comprises a bottom plate parallel to the inner side of the panel;
wherein an end of the light guiding member extends through the front panel and is aligned with the light source, a plurality of light beams emitted from the light source is guided to the light transmitting member via the end of the light guiding member and shines out from the light transmitting member;
wherein the light shading member keeps the plurality of light beams out of the inner side of the front panel, wherein the light shading member is received in the receiving space and located between the light guiding member and the bottom plate; and
wherein the front panel comprises a front wall, a first sidewall, and a second sidewalk the receiving space comprises a receiving groove defined in the front wall, a first mounting groove defined in the first sidewall, and a second mounting groove defined in the second sidewalk the light transmitting member comprises two main light portions, an auxiliary light portion connected to the two main light portions, and an engaging portion extending from a free end of one of the main light portions; the main light portions are received in the receiving groove, the auxiliary light portion is received in the first mounting groove, and the engaging portion is engaged in the second mounting groove.

2. The electronic device bezel of claim 1, wherein the light shading member is mounted on the bottom plate.

3. The electronic device bezel of claim 1, wherein the light transmitting member comprises an inner surface, and the light guiding member is received in a mounting slot defined in the inner surface.

4. The electronic device bezel of claim 3, wherein the light shading member is attached to the inner surface of the light transmitting member and the bottom plate.

5. The electronic device bezel of claim 1, wherein the first sidewall and the second sidewall are connected to the front wall and located at two opposite sides of the front wall, and two ends of the receiving groove are separately connected to the first mounting groove and the second mounting groove.

6. The electronic device bezel of claim 1, wherein the mounting slot is defined in the two main light portions and the auxiliary light portion.

7. The electronic device bezel of claim 1, wherein the two main light portions are substantially parallel to each other, and the auxiliary light portion is a substantially "U" shape.

8. The electronic device bezel of claim 1, wherein the front panel defines an opening configured to insert a disk drive therethrough, and the opening is defined in a bottom plate of the receiving groove.

9. The electronic device bezel of claim 8, further comprising a cover plate configured to cover the opening, and the cover plate is located among the two main light portions and the auxiliary light portion.

10. The electronic device bezel of claim 8, wherein the front panel further defines a through hole in the bottom plate the receiving groove, the end of the light guiding member is inserted through the through hole to the light source.

11. An electronic device bezel comprising:
a front panel defining a receiving space;
a light source mounted to the front panel;
a light shading member received in the received space;
a light transmitting member received in the receiving space and exposed from the front panel; and
a light guiding member clamped by the light shading member and the light transmitting member;
wherein the light guiding member receives a plurality of light beams emitted from the light source and guides the plurality of light beams to the transmitting member, and the light shading member keeps the plurality of light beams out of an inner side of the front panel; and
wherein the front panel comprises a front wall, a first sidewall, and a second sidewalk the receiving space comprises a receiving groove defined in the front wall, a first mounting groove defined in the first sidewall and a second mounting groove defined in the second sidewalk the light transmitting member comprises two main light portions, an auxiliary light portion connected to the two main light portions, and an engaging portion extending from a free end of one of the main light portions; the main light portions are received in the receiving groove, the auxiliary light portion is received in the first mounting groove, and the engaging portion is engaged in the second mounting groove.

12. The electronic device bezel of claim 11, wherein the receiving space comprises a bottom plate, and the light shading member is mounted on the bottom plate.

13. The electronic device bezel of claim 11, wherein the two main light portions are substantially parallel to each other, and the auxiliary light portion defines a "U" shape.

14. The electronic device bezel of claim 11, wherein the receiving groove comprises a first receiving groove and two second receiving grooves extending from a side of the receiving groove, the first receiving groove communicates with the first mounting groove, and the two second receiving grooves communicate with the second mounting groove.

15. The electronic device bezel of claim 14, wherein the front panel defines a through hole and an opening configured to insert a disk drive therethrough, the opening is defined in the bottom plate of the first receiving groove, the through hole is defined in the bottom plate of one of the two second receiving grooves, and an end of the light guiding member is inserted through the through hole and aligned with the light source.

16. The electronic device bezel of claim 15, further comprising a cover plate configured to cover the opening, wherein the cover plate is located between the two main light portions and the auxiliary light portion.

* * * * *